(12) United States Patent
Schmidt

(10) Patent No.: US 9,779,859 B2
(45) Date of Patent: Oct. 3, 2017

(54) ELECTRICAL MULTILAYER COMPONENT

(75) Inventor: Johann Schmidt, Graz (AT)

(73) Assignee: EPCOS AG, Munich (DE)

( * ) Notice: Subject to any disclaimer, the term of this patent is extended or adjusted under 35 U.S.C. 154(b) by 117 days.

(21) Appl. No.: 13/981,883

(22) PCT Filed: Mar. 13, 2012

(86) PCT No.: PCT/EP2012/054381
§ 371 (c)(1),
(2), (4) Date: Oct. 7, 2013

(87) PCT Pub. No.: WO2012/126774
PCT Pub. Date: Sep. 27, 2012

(65) Prior Publication Data
US 2014/0022695 A1 Jan. 23, 2014

(30) Foreign Application Priority Data
Mar. 24, 2011 (DE) .......................... 10 2011 014 965

(51) Int. Cl.
| | |
|---|---|
| *H01G 4/30* | (2006.01) |
| *H01G 4/06* | (2006.01) |
| *H01G 4/005* | (2006.01) |
| *H01G 4/012* | (2006.01) |
| *H01C 1/146* | (2006.01) |
| *H01C 7/18* | (2006.01) |
| *H01G 4/232* | (2006.01) |
| *H01C 7/10* | (2006.01) |

(52) U.S. Cl.
CPC .............. *H01C 1/146* (2013.01); *H01C 7/10* (2013.01); *H01C 7/18* (2013.01); *H01G 4/005* (2013.01); *H01G 4/232* (2013.01); *H01G 4/30* (2013.01)

(58) Field of Classification Search
CPC .......... H01G 4/30; H01G 4/232; H01G 4/005; H01G 4/012
USPC ................ 361/301.4, 303, 321.1, 304, 321.2
See application file for complete search history.

(56) References Cited

U.S. PATENT DOCUMENTS

| | | | |
|---|---|---|---|
| 4,661,884 A * | 4/1987 | Seaman .................... | H01G 4/30 29/25.42 |
| 5,324,986 A | 6/1994 | Ueno et al. | |
| 7,859,821 B2 | 12/2010 | Shimizu | |

(Continued)

FOREIGN PATENT DOCUMENTS

| | | |
|---|---|---|
| CN | 101677035 A | 3/2010 |
| CN | 101868838 A | 10/2010 |

(Continued)

*Primary Examiner* — Eric Thomas
*Assistant Examiner* — Arun Ramaswamy
(74) *Attorney, Agent, or Firm* — Slater Matsil, LLP

(57) ABSTRACT

An electrical multilayer component includes a stack composed of functional layers and also a first and a second external contact. The external contacts are arranged on side surfaces of the stack. Internal electrodes of a first type are directly electrically conductively connected to the first external contact and internal electrodes of a second type directly electrically conductively connected to the second external contact. An internal electrode of the first type and an internal electrode of the second type partly overlap. An internal electrode of the first type and an internal electrode of the second type are arranged in a manner spaced apart from one another in an identical plane.

10 Claims, 3 Drawing Sheets

(56) References Cited

U.S. PATENT DOCUMENTS

| | | |
|---|---|---|
| 8,068,329 B2 | 11/2011 | Tani |
| 8,213,152 B2 | 7/2012 | Taniguchi et al. |
| 2002/0125547 A1 | 9/2002 | Kawase et al. |
| 2006/0279172 A1 | 12/2006 | Ito et al. |
| 2007/0025054 A1 | 2/2007 | Tonogai et al. |
| 2008/0084651 A1* | 4/2008 | Oguni et al. ............ 361/303 |
| 2009/0052113 A1* | 2/2009 | Togashi ............ H01G 4/012 361/306.3 |
| 2009/0310278 A1 | 12/2009 | Tani |
| 2009/0316330 A1 | 12/2009 | Taniguchi et al. |
| 2010/0039749 A1* | 2/2010 | Ritter et al. ............ 361/301.4 |
| 2010/0039750 A1* | 2/2010 | Togashi ............ H01G 4/005 361/303 |
| 2010/0079925 A1* | 4/2010 | Togashi ............ H01G 4/005 361/306.3 |
| 2010/0271752 A1* | 10/2010 | Ishida ............ H01G 4/012 361/303 |

FOREIGN PATENT DOCUMENTS

| | | |
|---|---|---|
| DE | 10045195 A1 | 4/2001 |
| DE | 10235011 A1 | 2/2004 |
| EP | 1369880 B1 | 10/2007 |
| JP | H07135124 A | 5/1995 |
| JP | H07263270 A | 10/1995 |
| JP | 10335179 A | 12/1998 |
| JP | 1174149 A | 3/1999 |
| JP | H11297509 A | 10/1999 |
| JP | 2000311830 A | 11/2000 |
| JP | 2006190774 A | 7/2006 |
| JP | 2006237078 A | 9/2006 |
| JP | 2010003891 A | 1/2010 |
| JP | 2010021523 A | 1/2010 |

* cited by examiner

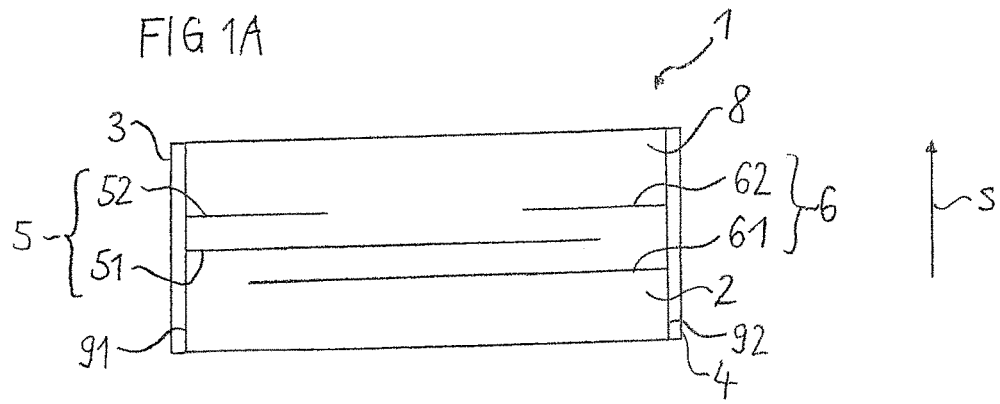
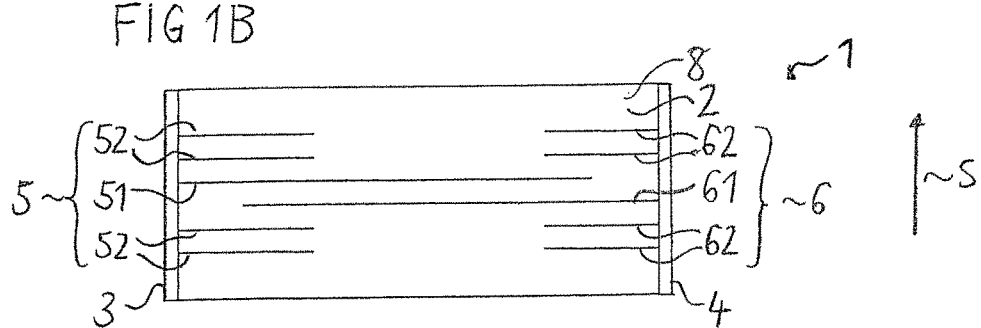
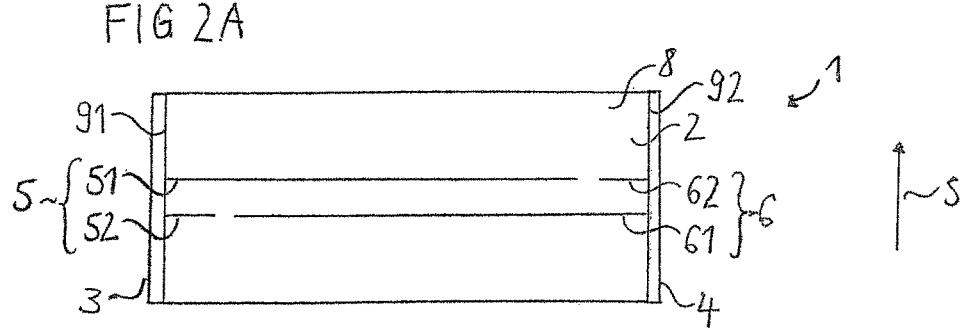
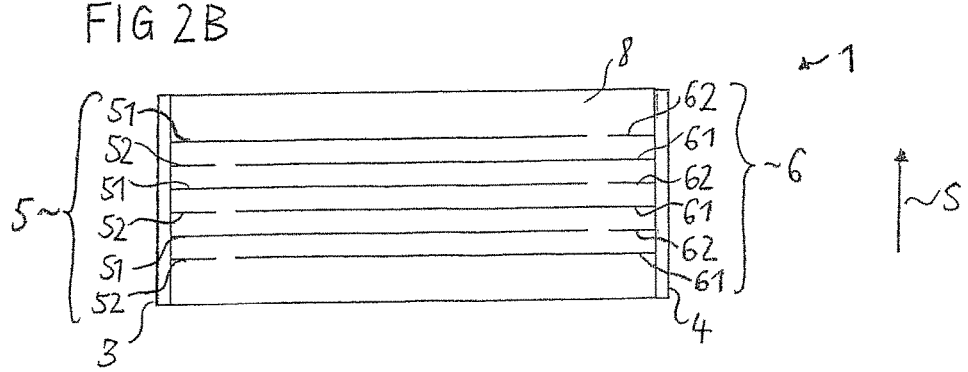

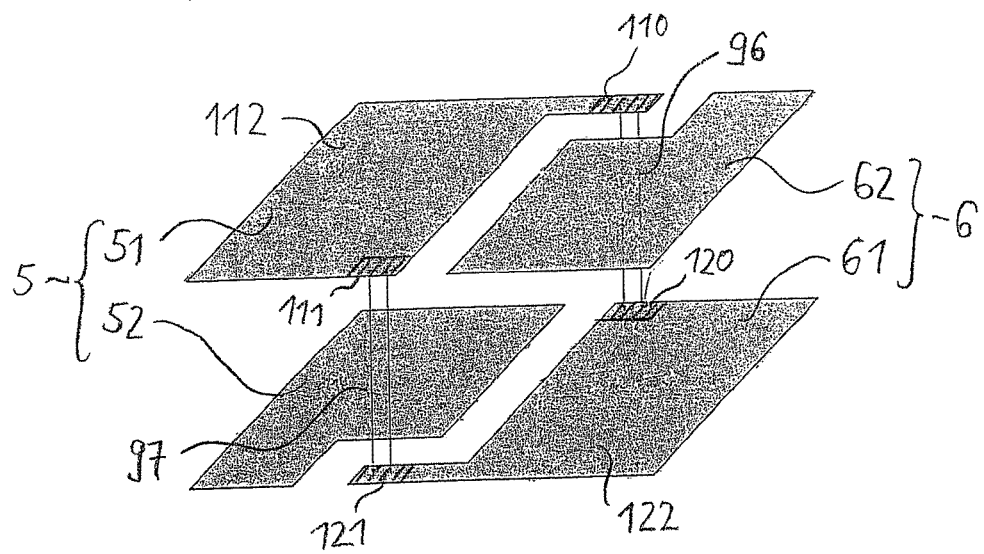
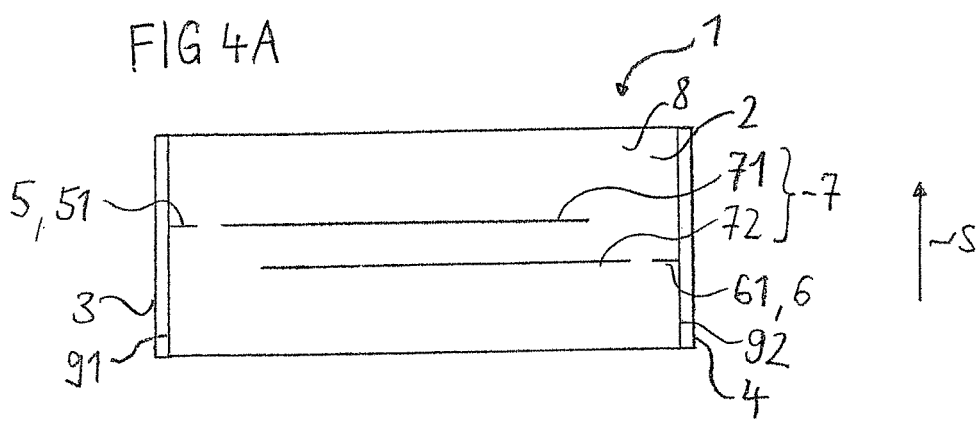
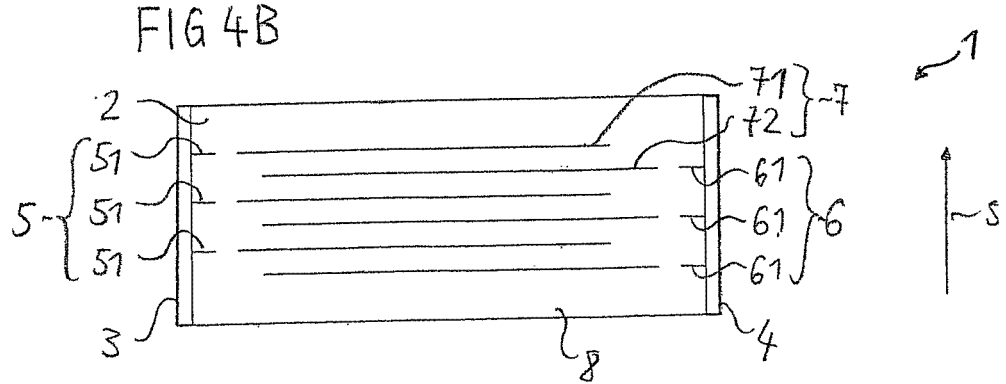

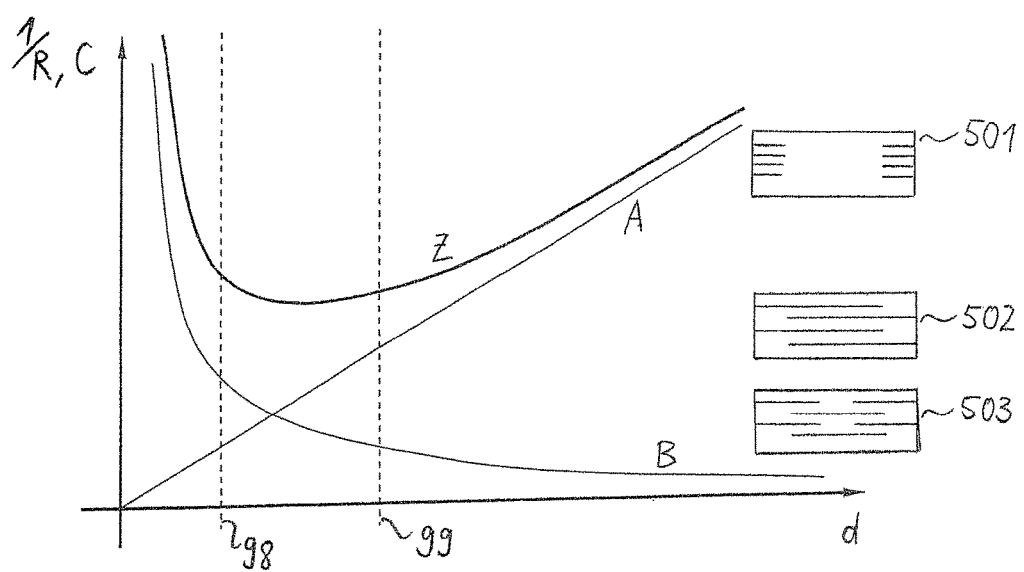

ELECTRICAL MULTILAYER COMPONENT

This patent application is a national phase filing under section 371 of PCT/EP2012/054381, filed Mar. 13, 2012, which claims the priority of German patent application 10 2011 014 965.1, filed Mar. 24, 2011, each of which is incorporated herein by reference in its entirety.

TECHNICAL FIELD

An electrical multilayer component comprising a stack composed of functional layers and internal electrodes arranged therebetween is specified.

BACKGROUND

External contacts can be fixed to the side surfaces of the stack for making electrical contact with the internal electrodes. An electrical multilayer component of this type can be embodied, for example, as a multilayer resistance component, as a multilayer varistor or as a multilayer capacitor.

SUMMARY OF THE INVENTION

Specific embodiments specify a geometry of an electrical multilayer component, in particular an internal and external electrode arrangement of an electrical multilayer component, which has improved properties in comparison with known multilayer components.

The electrical properties of multilayer components are dependent, besides quite a few other factors, in particular also on the geometrical arrangement of the internal electrodes. The thickness of the functional layers of a multilayer component, such as, for example, the thickness of the dielectric layers in the case of a multilayer capacitor, can usually be kept constant only very poorly owing to the dictates of production. However, the thickness fluctuations of the functional layers effect the electrical values of the multilayer component, such as, for example, the capacitance of a multilayer capacitor or the resistance of a multilayer resistance component, that is to say, for instance, of a PTC or NTC component. In order to prevent the electrical values of multilayer components deviating from a predetermined desired value to an excessively great extent as a result of the production-dictated thickness fluctuations of the function layers, that is to say in order to avoid correspondingly wide tolerance bands, for example, films that later form the functional layers of the finished component are preselected, or else subsequent selection of the finished components is effected, wherein components whose electrical properties deviate from the predetermined desired values to an excessively great extent are sorted out. Furthermore, the electrical values of a component can also be subsequently adapted by a so-called adjustment, for example, by parts of the multilayer component being cut away by grinding away or trimming. A combination of the aforementioned possibilities for eliminating or at least reducing the disadvantages associated with the production-dictated thickness fluctuations of the functional layers is also conceivable.

The inventors have discovered that the electrical values of a multilayer component, such as, for example, the resistance and/or the capacitance of a multilayer component, can be made independent of thickness fluctuations of the functional layers to the greatest possible extent by means of an internal electrode arrangement described here.

In accordance with one embodiment, the electrical multilayer component according to the invention comprises a stack comprising functional layers and a plurality of internal electrodes and also a first and a second external contact. The functional layers can be, for example, dielectric layers or electrically conductive layers, depending on whether the electrical multilayer component is embodied as a capacitor, as a varistor or as a thermistor. By virtue of their respective properties, the functional layers determine the functioning of the component. By way of example, the functional layers can be plastic layers or ceramic layers.

In order to produce the multilayer component, the functional layers are stacked one above another, thus resulting in a stacking direction. The interfaces of adjacent functional layers determine layer planes of the multilayer component which are arranged one above another along the stacking direction of the functional layers. The internal electrodes are arranged in such layer planes.

The external contacts serving for making contact with the internal electrodes are preferably arranged on side surfaces of the stack. That means that the external contacts are preferably arranged on different side surfaces of the stack, for example, on opposite side surfaces of the stack or on different regions of a side surface.

In accordance with a further embodiment, the electrical multilayer component comprises at least two internal electrodes of a first type, which are directly electrically conductively connected to the first external contact. Furthermore the electrical multilayer component comprises at least two internal electrodes of a second type, which are directly electrically conductively connected to the second external contact. In this case, at least one internal electrode of the first type and at least one internal electrode of the second type partly overlap. In other words, at least one internal electrode of the first type has at least one partial region which, in the case of conceptual projection in the stacking direction of the stack, could be brought to congruence with at least one partial region of at least one internal electrode of the second type. Here and hereinafter, "directly electrically conductively connected" means that an internal electrode adjoins an external contact and is therefore directly connected to the external contact. If the external contact is arranged at a side surface of the stack, then an internal electrode directly electrically conductively connected to the external contact extends as far as said side surface.

Furthermore, at least one internal electrode of the first type and at least one internal electrode of the second type are arranged in a manner spaced apart from one another in an identical plane. This plane is formed by a layer plane formed perpendicularly to the stacking direction of the stack, and can also be designated hereinafter as layer extension plane. In this case, a gap is present between the at least one internal electrode of the first type and the at least one internal electrode of the second type. Said gap constitutes a region between the at least one internal electrode of the first type and the at least one internal electrode of the second type in the layer plane in which no internal electrodes are arranged.

The internal electrode arrangement described here of a component according to the invention, that is to say the combination of overlapping internal electrodes and of internal electrodes which are separated from one another by a gap in the same layer plane, can reduce negative effects of manufacturing-dictated layer thickness fluctuations of the functional layers. As is explained in greater detail further below in association with the figures, in particular the combinations described here of the different arrangements of the internal electrodes of the first and of the second type can bring about mutually compensating effects caused by layer thickness fluctuations. Thus, in comparison with known components, in the case of the component described here, even in the case of thickness fluctuations of the functional layers from component to component, it is possible to achieve a substantially identical predetermined desired resistance and/or a predetermined capacitance in the case of said components.

In accordance with one embodiment, at least one internal electrode of one type overlaps all the internal electrodes of the other type. By way of example, the at least one internal electrode of the first type can overlap all the internal electrodes of the second type. Furthermore, it is also possible for a plurality of internal electrodes of the first type to overlap all the internal electrodes of the second type. Furthermore, the at least one internal electrode of the second type can overlap all the internal electrodes of the first type. It is also conceivable for a plurality of internal electrodes of the second type to overlap all the internal electrodes of the first type. Furthermore, it is also possible for all the internal electrodes of the first type to overlap all the internal electrodes of the second type.

In accordance with a further embodiment, at least one internal electrode of one type is arranged in a plane perpendicular to the stacking direction of the stack which is free of internal electrodes of the other type. By way of example, at least one internal electrode of the first type can be arranged in a plane which is free of internal electrodes of the second type. In accordance with a further embodiment, at least one internal electrode of the second type is arranged in a plane which is free of internal electrodes of the first type.

In a further embodiment, an internal electrode of the first type and an internal electrode of the second type are in each case arranged in an identical plane perpendicular to the stacking direction. That means that for each internal electrode of the first type an internal electrode of the second type is provided in the same plane, and, on the other hand, for each internal electrode of the second type an internal electrode of the first type is provided in the same plane.

In accordance with a further embodiment, each internal electrode is at a substantially identical distance from the internal electrode situated closest in each case in the stacking direction. In other words, directly adjacent internal electrodes are arranged in different layer extension planes perpendicular to the stacking direction, which are in each case at an identical distance from one another. In this case, here and hereinafter "substantially identical" means that the deviations are in the range of the tolerances of the production method, here for example, in the range of the tolerances of the layer thicknesses of the functional layers.

Preferably, the electrical multilayer component is constructed symmetrically. By way of example, the multilayer component can be constructed axially symmetrically with respect to one or more spatial axes. The component can also have a point symmetry, wherein the component is preferably point-symmetrical with respect to a midpoint of the component, which is in each case at an identical distance from opposite side surfaces of the component.

In accordance with a further embodiment, the internal electrodes of the first type and the internal electrodes of the second type have a rectangular shape.

In accordance with a further embodiment, the internal electrodes of the first type and the internal electrodes of the second type have a hexagonal shape. By way of example, the internal electrodes of the first type and the internal electrodes of the second type can be embodied in L shaped fashion.

In accordance with a further embodiment, the at least one internal electrode of the first type and the at least one internal electrode of the second type which at least partly overlap in each case have two first regions and a second region situated between the two first regions. The two first regions of the at least one internal electrode of the first type and the two first regions of the at least one internal electrode of the second type overlap. The second region of the at least one internal electrode of the first type is arranged in a manner free of overlap by the second region of the at least one internal electrode of the second type.

In accordance with at least one further embodiment, an electrical multilayer component comprises at least one internal electrode of a first type, which is directly electrically conductively connected to the first external contact, and at least one internal electrode of a second type, which is directly electrically conductively connected to the second external contact. Furthermore, the multilayer component can comprise at least two internal electrodes of a third type which are directly electrically conductively connected neither to the first nor to the second external contact and which at least partly overlap one another. In this case, at least one internal electrode of the first type and an internal electrode of the third type are arranged in a manner spaced apart from one another in an identical plane. Furthermore, at least one internal electrode of the second type and an internal electrode of the third type are arranged in a manner spaced apart from one another in an identical plane.

In accordance with a further embodiment, the electrical multilayer component has a resistance and/or a capacitance which are/is substantially insensitive to thickness fluctuations of the functional layers. The particular internal electrode arrangement of a component described here can therefore advantageously reduce negative effects of manufacturing-dictated layer thickness fluctuations of the functional layers.

In accordance with a further embodiment, the at least one internal electrode of the first type and the at least one internal electrode of the second type are arranged in different planes. That is to say that the at least one internal electrode of the first type and the at least one internal electrode of the second type are arranged in different layer extension planes perpendicular to the stacking direction.

In accordance with a further embodiment, the at least one internal electrode of the first type is arranged in a manner free of overlap by the at least one internal electrode of the second type. The at least one internal electrode of the first type therefore does not overlap the at least one internal electrode of the second type.

In accordance with a further embodiment, the at least two internal electrodes of the third type at least partly overlap. In other words, the at least two internal electrodes of the third type have partial regions which could be brought to congruence by a conceptual displacement or projection in the stacking direction.

In accordance with a further embodiment, the multilayer component is an NTC thermistor, a PTC thermistor, a varistor or a capacitor component.

BRIEF DESCRIPTION OF THE DRAWINGS

Further advantages and advantageous embodiments of the electrical multilayer component will become apparent from the embodiments described below in conjunction with FIGS. 1A to 5.

FIGS. 1A to 2B show cross sections of multilayer components in accordance with a plurality of exemplary embodiments;

FIG. 3 shows a schematic view of the internal electrodes of a multilayer component in accordance with a further exemplary embodiment;

FIGS. 4A and 4B show cross sections of multilayer components in accordance with further exemplary embodiments; and FIG. 5 shows a diagram illustrating the resistance or the capacitance of a multilayer component as a function of the thickness of the functional layers.

In the exemplary embodiments and figures, identical or identically acting component parts may respectively be provided with the same reference symbols. The illustrated elements and their size relationships among one another should not be regarded as true to scale, in principle; rather, individual elements such as, for example, layers, components and regions may be illustrated with exaggerated thickness or size dimensions in order to enable better illustration and/or in order to afford a better understanding.

DETAILED DESCRIPTION OF ILLUSTRATIVE EMBODIMENTS

FIG. 1A shows a cross section of an electrical multilayer component 1 in accordance with one exemplary embodiment comprising a stack 8 composed of functional layers 2 arranged one on top of another in a stacking direction S. Furthermore, the multilayer component 1 comprises internal electrodes 51, 52, 61, 62, which are arranged in layer planes of the multilayer component 1, wherein the layer planes are determined by the interfaces of functional layers adjacent to one another. By means of sintering, for example, a monolithic body as shown in FIG. 1A is formed in which the functional layers 2 and the internal electrodes 51, 52, 61, 62 are connected to one another.

The functional layers 2 can be embodied as dielectric layers, for example, such that the multilayer component is embodied as a capacitor. As an alternative thereto, the functional layers can also be electrically conductive layers, in particular composed of a material having a variable resistance, such that the electrical multilayer component can be embodied as a varistor or as a thermistor.

External contacts 3, 4 are arranged on two side surfaces 91, 92 of the stack 8. The side surfaces 91, 92 are, as shown in FIG. 1A, opposite side surfaces. As an alternative thereto, the side surfaces can, for example, also be mutually adjoining side surfaces of the stack 8. In the exemplary embodiment shown, the external contacts 3, 4 respectively cover an entire side surface 91, 92 of the stack 8. As an alternative thereto, the external contacts 3, 4 can also cover partial regions of the side surfaces of the stack 8 or be embodied as cap-shaped external contacts arranged in an edge-embracing fashion on a plurality of side surfaces of the stack 8. Such cap-shaped external contacts can be produced, for example, by dipping the component into a conductive paste.

Furthermore, the multilayer component 1 comprises two internal electrodes 51, 52 of a first type 5, which are directly electrically conductively connected to the first external contact 3. The internal electrodes 51, 52 of the first type 5 project from the first external contact 3 into the stack 8. Furthermore, the multilayer component 1 comprises two internal electrodes 61, 62 of a second type 6, which are directly electrically conductively connected to the second external contact 4 and project into the stack 8. The internal electrode 51 of the first type 5 overlaps the internal electrode 61 of the second type 6.

Furthermore, the internal electrode 52 of the first type 5 and the internal electrode 62 of the second type 6 are arranged in an identical plane, wherein there is present between them a region which is free of internal electrodes and which forms a gap.

Preferably, the internal electrode 61 of the second type 6 is at a distance from the internal electrode 51 of the first type 5 situated closest in the stacking direction S, which distance substantially corresponds to the distance between the internal electrode 51 of the first type and the internal electrode 52 of the first type 5 or 62 of the second type 6 respectively situated closest in the stacking direction.

Furthermore, in the exemplary embodiment shown, the internal electrodes 51, 61 of the first and of the second type 5, 6 which at least partly overlap one another are arranged in planes that are respectively free of electrodes of the other type.

FIG. 5 illustrates a diagram showing qualitatively the conductance 1/R or the capacitance C of such a multilayer component as a function of the layer thickness d of the functional layers. In this case, the curve A corresponds to the typical conductance or capacitance profile in the case of known multilayer components whose internal electrodes are arranged in the so-called "gap design" 501, that is to say that their internal electrodes are arranged in a manner free of overlap and with a gap. In the case of such a "gap design," an electric field or a current flow forms substantially parallel to the internal electrodes and the capacitance or the conductance of such components rises approximately proportionally to the layer thickness.

The curve B shows the typical conductance or capacitance profile of known multilayer components whose internal electrodes are arranged in a so-called "overlap design" 502 or "T-design" 503. In the case of the overlap design, alternately arranged internal electrodes respectively overlap in the stacking direction. In the case of the overlap design, an electric field or a current flow forms substantially in the stacking direction, that is to say perpendicular to the internal electrodes. The T-design substantially constitutes a series connection of two overlap designs. The capacitance or the conductance of such components decreases approximately indirectly proportionally with increasing layer thickness.

In the case of the known component designs, therefore, layer thickness variations directly affect the electrical values, as a result of which process-dictated layer thickness fluctuations lead to components having different electrical values.

In the case of the multilayer components described here, a superposition of the abovementioned effects of the known components can be achieved, as is shown on the basis of the curve Z in FIG. 5. By virtue of the special internal electrode arrangement, the dependencies of the electrical values on the layer thickness of the functional layers as described in association with the curves A and B are superposed. It can readily be discerned that the curve Z has an approximately flat profile in a range identified by the two dashed vertical lines 98, 99. This means that the resistance or the capacitance of the multilayer components described here in this range is virtually independent of production-dictated thickness fluctuations of the functional layers.

FIG. 1B shows a cross section of a multilayer component 1 in accordance with a further exemplary embodiment, in which, in comparison with the multilayer component illustrated in FIG. 1A, further internal electrodes 52, 62 of the first and of the second type 5, 6 are present, which are arranged in a manner spaced apart from one another in an identical plane. The multilayer component 1 in FIG. 1B comprises a plurality of internal electrodes 51, 52 of the first type 5 and a plurality of internal electrodes 61, 62 of the second type 6, wherein at least two internal electrodes 52 of the first type 5 are in each case arranged in an identical plane with an internal electrode 62 of the second type 6, and at least one internal electrode 51 of the first type 5 overlaps an internal electrode 61 of the second type 6 that is directly adjacent thereto in the stacking direction.

Furthermore, in the exemplary embodiment shown, the internal electrode 51 of the first type 5 overlaps all the internal electrodes 61, 62 of the second type 6. The internal electrode 61 of the second type 6 overlaps all the internal electrodes 51, 52 of the first type 5. The internal electrode 51 of the first type 5 is arranged in a plane that is free of internal electrodes of the second type 6. Likewise, the internal electrode 61 of the second type 6 is arranged in a plane that is free of internal electrodes of the first type 5.

Furthermore, in the exemplary embodiment shown, the overlapping internal electrodes 51, 61 of the first and second types 5, 6 are arranged in the stacking direction between the internal electrodes 52, 62 of the first and second types 5, 6 that are respectively arranged in an identical plane.

Preferably, all the internal electrodes are at a substantially identical distance from the internal electrode(s) situated closest in each case in the stacking direction S.

The internal electrode arrangement of the multilayer component illustrated in FIG. 1B can be regarded as a combination of a gap design with an overlap design, wherein the gap design and the overlap design are stacked vertically and connected in parallel in the current flow direction. In comparison with the exemplary embodiment shown in FIG. 1A, in the multilayer component 1 illustrated in FIG. 1B, it is possible to choose smaller distances both in the stacking direction and along the layer planes, as a result of which a higher capacitance or a lower resistance can be achieved.

As an alternative thereto, a plurality of internal electrodes of the first type and internal electrodes of the second type can also be present, which overlap if a greater proportion or effect of the overlap design is desired. The internal electrodes arranged in an identical plane can also be arranged in the stacking direction between at least two pairs of overlapping internal electrodes of the first and second types.

FIG. 2A shows an electrical multilayer component 1 in accordance with a further exemplary embodiment comprising two internal electrodes 51, 52 of the first type 5, which are directly electrically conductively contact-connected to a first external contact 3, and two internal electrodes 61, 62 of the second type 6, which are directly electrically conductively connected to a second external contact 4. The internal electrode 51 of the first type 5 and the internal electrode 61 of the second type 6 overlap. The internal electrode 51 of the first type 5 and the internal electrode 62 of the second type 6 are arranged in a manner spaced apart from one another in an identical plane. Likewise, the internal electrode 52 of the first type 5 and the internal electrode 61 of the second type 6 are arranged in a manner spaced apart from one another in an identical plane.

Furthermore, in the exemplary embodiment shown, each of the internal electrodes 51, 52 of the first type 5 is arranged in an identical plane with respect to an internal electrode 61, 62 of the second type 6. On the other hand, each of the internal electrodes 61, 62 of the second type 6 is arranged in an identical plane with respect to an internal electrode 51, 52 of the first type 5.

The internal electrode arrangement of the multilayer component 1 illustrated in FIG. 2A can again be regarded as a combination of a gap design with an overlap design, wherein gap design and overlap design are connected in parallel horizontally in the current flow direction or in the direction of the applied electric field.

FIG. 2B shows an electrical multilayer component 1 in accordance with a further exemplary embodiment, wherein the internal electrode arrangement in accordance with the multilayer component from FIG. 2A is present repeatedly. The multilayer component 1 in FIG. 2B comprises a plurality of internal electrodes 51, 52 of the first type 5 and a plurality of internal electrodes 61, 62 of the second type 6, wherein each of the internal electrodes 51, 52 of the first type 5 is arranged in an identical plane with respect to an internal electrode 61, 62 of the second type 6, and wherein each of the internal electrodes 61, 62 of the second type 6 is arranged in an identical plane with respect to an internal electrode 51, 52 of the first type 5.

Furthermore, in the exemplary embodiment shown, each internal electrode 51 of the first type 5 which overlaps at least one internal electrode 61 of the second type 6 is arranged directly adjacent to an overlapping internal electrode 61 of the second type 6. On the other hand, each internal electrode 61 of the second type 6 which overlaps at least one internal electrode 51 of the first type 5 is arranged directly adjacent to an overlapping internal electrode 51 of the first type 5.

In particular, the multilayer component 1 in FIG. 2B comprises, purely by way of example, six internal electrodes of the first type 5 and also six internal electrodes of the second type 6, of which an internal electrode 51, 52 of the first type 5 and an internal electrode 61, 62 of the second type 6 are respectively arranged in a manner spaced apart from one another in six identical planes adjacent to one another, and wherein three internal electrodes 51 of the first type 5 and three internal electrodes 61 of the second type 6 respectively overlap.

The internal electrodes of the exemplary embodiments shown in FIGS. 1A to 2B preferably have a rectangular shape. Alternatively, the internal electrodes can also have other geometrical shapes.

FIG. 3 schematically illustrates four internal electrodes of a multilayer component in accordance with a further exemplary embodiment. The internal electrodes 51, 52 of the first type 5 and 61, 62 of the second type 6 each have an L-shape. The internal electrode arrangement of the multilayer component shown in FIG. 3 can be regarded as a combination of a gap design with an overlap design, wherein gap design and overlap design are connected in parallel transversely with respect to the current flow direction or with respect to the direction of an applied electric field.

The internal electrodes 51 of the first type 5 and 62 of the second type 6 are arranged in a manner spaced apart from one another in an identical plane. Likewise, the internal electrodes 52 of the first type 5 and 61 of the second type 6 are arranged in a manner spaced apart from one another in an identical plane. The internal electrode 51 of the first type 5 and the internal electrode 61 of the second type 6 in each case have two first regions 110, 111, 120, 121, which are in each case separated from one another by a second region 112, 122. The two first regions 110, 111 of the internal electrode 51 of the first type 5 and the two first regions 120, 121 of the internal electrode 61 of the second type 6 overlap. The respectively overlapping regions 110 and 120, and 111 and 121, are respectively illustrated as connected with arrows 96, 97 in FIG. 3. The second region 112 of the internal electrode 51 of the first type 5 and the second region 122 of the internal electrode 61 of the second type 6 are arranged in a manner free of overlap by one another.

What can likewise be achieved by means of the internal electrode arrangement shown in FIG. 3 is that the resistance or the capacitance of the multilayer component can be made independent of production-dictated thickness fluctuations of the functional layers 2 to the greatest possible extent.

FIG. 4A shows a cross section of a multilayer component 1 in accordance with a further exemplary embodiment comprising a stack 8 composed of functional layers 2 and also a first and a second external contact 3, 4, wherein the external contacts 3, 4 are arranged on side surfaces of the stack 8. Furthermore, the multilayer component 1 comprises an internal electrode 51 of a first type 5, which is directly electrically conductively connected to the first external contact 3, and an internal electrode 61 of a second type 6, which is directly electrically conductively connected to the second external contact 4.

Two internal electrodes 71, 72 of a third type 7 are present, which are directly electrically conductively connected neither to the first nor to the second external contact 3, 4. The internal electrode 51 of the first type 5 and the internal electrode 71 of the third type 7 are arranged in a manner spaced apart from one another in an identical plane. Likewise, the internal electrode 61 of the second type 6 and the internal electrode 72 of the third type 7 are arranged in a manner spaced apart from one another in an identical plane. The internal electrode 51 of the first type 5 and the internal electrode 61 of the second type 6 are arranged in different planes. The two internal electrodes 71, 72 of the third type overlap. By contrast, the internal electrodes 51 of the first type 5 and 61 of the second type 6 are arranged in a manner free of overlap.

The internal electrode arrangement of the multilayer component 1 illustrated in FIG. 4A can be regarded as a combination of a gap design and overlap design, which are horizontally connected in series.

In the case of the electrical multilayer component 1 illustrated in FIG. 4B, the electrode configuration of the multilayer component in accordance with FIG. 4A is embodied in repeated fashion. The multilayer component 1 in FIG. 4B comprises a plurality of internal electrodes 51 of the first type 5, a plurality of internal electrodes 61 of the second type 6 and a plurality of internal electrodes 71, 72 of the third type 7, wherein the internal electrodes 71, 72 of the third type 7 are arranged one above another directly adjacent to one another in the stacking direction S and are arranged in each case alternately with an internal electrode 51 of the first type 5 and an internal electrode 61 of the second type 6 in an identical plane. In planes directly adjacent to one another, therefore, an internal electrode 71 of the third type 7 with an internal electrode 51 of the first type 5 and an internal electrode 72 of the third type 7 with an internal electrode 61 of the second type 6 are arranged alternately. In particular, the multilayer component 1 in accordance with FIG. 4B comprises, purely by way of example, three internal electrodes 51 of the first type 5, three internal electrodes 61 of the second type 6 and six internal electrodes 71, 72 of the third type 7.

By virtue of the multiple arrangement of the internal electrodes shown, the capacitance or the resistance of the multilayer component 1 can be adapted in comparison with the exemplary embodiment in accordance with FIG. 4A.

The invention is not restricted to the exemplary embodiments by the description on the basis of said exemplary embodiments, but rather encompasses any novel feature and also any combination of features. This includes, in particular, any combination of features in the patent claims, even if this feature or this combination itself is not explicitly specified in the patent claims or exemplary embodiments.

The invention claimed is:

1. An electrical multilayer component comprising:
   a stack comprising functional layers;
   a first external contact and a second external contact arranged on side surfaces of the stack;
   a plurality of internal electrodes of a first type, which are directly electrically conductively connected to the first external contact; and
   a plurality of internal electrodes of a second type, which are directly electrically conductively connected to the second external contact,
   wherein at least one internal electrode of the first type and at least one internal electrode of the second type partly overlap,
   wherein at least one internal electrode of the first type and at least one internal electrode of the second type are arranged in a manner spaced apart from one another in an identical plane,
   wherein the internal electrodes of the first type and the internal electrodes of the second type are each embodied in an L shaped fashion,
   wherein the at least one internal electrode of the first type and the at least one internal electrode of the second type that at least partly overlap each have two first regions and a second region situated between the two first regions,
   wherein the two first regions of the at least one internal electrode of the first type and the two first regions of the at least one internal electrode of the second type overlap,
   wherein the second region of the at least one internal electrode of the first type does not overlap the second region of the at least one internal electrode of the second type, and
   wherein at least two internal electrodes of the first type are each arranged in an identical plane with an internal electrode of the second type, and wherein the internal electrodes of the first and of the second types that at least partly overlap one another are directly adjacent to one another in a stacking direction.

2. The component according to claim 1, wherein at least one internal electrode of the first type overlaps all the internal electrodes of the second type.

3. The component according to claim 1, wherein at least one internal electrode of the first type is arranged in a layer which is free of any internal electrodes of the second type.

4. The component according to claim 1, wherein the overlapping internal electrodes of the first and second types are arranged in the stacking direction between the internal electrodes of the first and second types that are in each case arranged in an identical plane.

5. The component according to claim 1, wherein each of the internal electrodes of the first type is arranged in an identical plane with respect to an internal electrode of the second type, and wherein each of the internal electrodes of the second type is arranged in an identical plane with respect to an internal electrode of the first type.

6. The component according to claim 5, wherein each internal electrode of the first type that overlaps at least one internal electrode of the second type is arranged directly adjacent to an overlapping internal electrode of the second type.

7. The component according to claim 1, wherein each internal electrode is at a substantially identical distance from the internal electrode situated closest in a stacking direction.

8. The component according to claim 1, wherein the internal electrodes of the first type and the internal electrodes of the second type each have a rectangular shape.

9. An electrical multilayer component comprising:

a stack composed of functional layers;

a first external contact and a second external contact arranged on side surfaces of the stack;

at least one internal electrode of a first type directly electrically conductively connected to the first external contact;

at least one internal electrode of a second type directly electrically conductively connected to the second external contact, wherein the at least one internal electrode of the first type does not overlap the at least one internal electrode of the second type; and at least two internal electrodes of a third type, none of the at least two internal electrodes of the third type are directly electrically conductively connected to the first external contact and the second external contact, wherein the at least two internal electrodes of the third type are floating, wherein the at least one internal electrode of the first type and a first internal electrode of the third type are spaced apart from one another in a first identical plane, wherein the at least one internal electrode of the second type and a second internal electrode of the third type are spaced apart from one another in a second identical plane, wherein the first internal electrode of the third type and the second internal electrode of the third type at least partly overlap, wherein the first identical plane and the second identical plane are located in different planes, wherein the first identical plane is free of any internal electrode of the second type and the second identical plane is free of any internal electrode of the first type, and wherein both the at least one internal electrode of the first type and the at least one internal electrode of the second type do not overlap with any internal electrodes of the third type.

10. The component according to claim 9, wherein the component comprises a plurality of internal electrodes of the first type, a plurality of internal electrodes of the second type and a plurality of internal electrodes of the third type, wherein the internal electrodes of the third type are arranged one above another directly adjacent to one another in a stacking direction and are arranged alternately with an internal electrode of the first type and an internal electrode of the second type in the first and second identical planes.

* * * * *